(12) United States Patent
Kitahashi

(10) Patent No.: US 6,690,366 B1
(45) Date of Patent: Feb. 10, 2004

(54) DISPLAY APPARATUS

(75) Inventor: Tomoki Kitahashi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 264 days.

(21) Appl. No.: 09/722,883

(22) Filed: Nov. 28, 2000

(30) Foreign Application Priority Data

Dec. 27, 1999 (JP) ............................................ 11-371969

(51) Int. Cl.$^7$ ................................................. G09G 5/00
(52) U.S. Cl. ....................................... 345/211; 345/212
(58) Field of Search ................................ 345/211, 212, 345/213, 98, 90, 97, 105; 455/90; 340/5–23

(56) References Cited

U.S. PATENT DOCUMENTS

| | | | | |
|---|---|---|---|---|
| 4,709,201 A | * | 11/1987 | Schaefer et al. ............. | 320/112 |
| 5,481,274 A | * | 1/1996 | Aratani et al. ................ | 345/97 |
| 5,592,191 A | * | 1/1997 | Tsuboyama et al. .......... | 345/94 |
| 5,602,536 A | * | 2/1997 | Henderson et al. ......... | 340/5.23 |
| 5,858,570 A | * | 1/1999 | Akagi ........................... | 429/50 |
| 5,873,990 A | * | 2/1999 | Wojciechowski et al. ... | 204/406 |
| 5,952,991 A | * | 9/1999 | Akiyama ..................... | 345/90 |
| 6,459,175 B1 | * | 10/2002 | Potega ......................... | 307/149 |

FOREIGN PATENT DOCUMENTS

| | | | |
|---|---|---|---|
| JP | A-6-4041 | | 1/1994 |
| JP | A-6-4047 | | 1/1994 |
| JP | A-6-274120 | | 9/1994 |
| JP | A-8-110511 | | 4/1996 |
| JP | A-8-160385 | | 6/1996 |
| JP | 2670045 | * | 7/1997 |
| JP | B2-2670045 | | 7/1997 |

* cited by examiner

Primary Examiner—Vijay Shankar
Assistant Examiner—Prabodh M Dharia
(74) Attorney, Agent, or Firm—Oliff & Berridge, PLC

(57) ABSTRACT

There is provided a display apparatus utilizing a display unit having memory properties, which notifies a user of the facts that the batteries have become low, that the batteries have been removed, that a normal voltage has been recovered as a result of reloading of batteries and the like. A display unit has memory properties and displays images under control of a display control unit. A power supply unit may be constituted by, for example, batteries and supplies power to each part of the apparatus. The power supply unit transmits a voltage drop signal to a central processing unit when the voltage of the batteries falls below a predetermined voltage. Upon receipt of the voltage drop signal, the central processing unit causes a part or the whole of a display area of the display unit to display the fact that the batteries are dead. It performs control to prevent a display from being changed even if an operating unit is operated or display information is received thereafter.

16 Claims, 9 Drawing Sheets

DISPLAY OF BATTERY ALIVE STATE

DISPLAY OF BATTERY DEAD STATE

FIG. 11   DISPLAY OF LOW BATTERY STATE   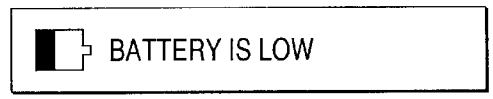 BATTERY IS LOW
FIG. 12
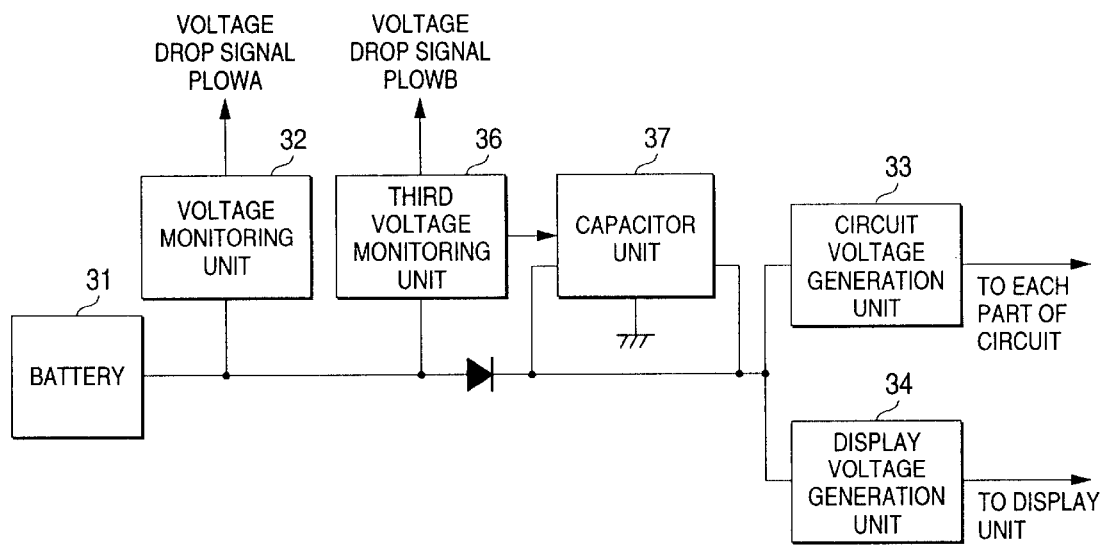
FIG. 13
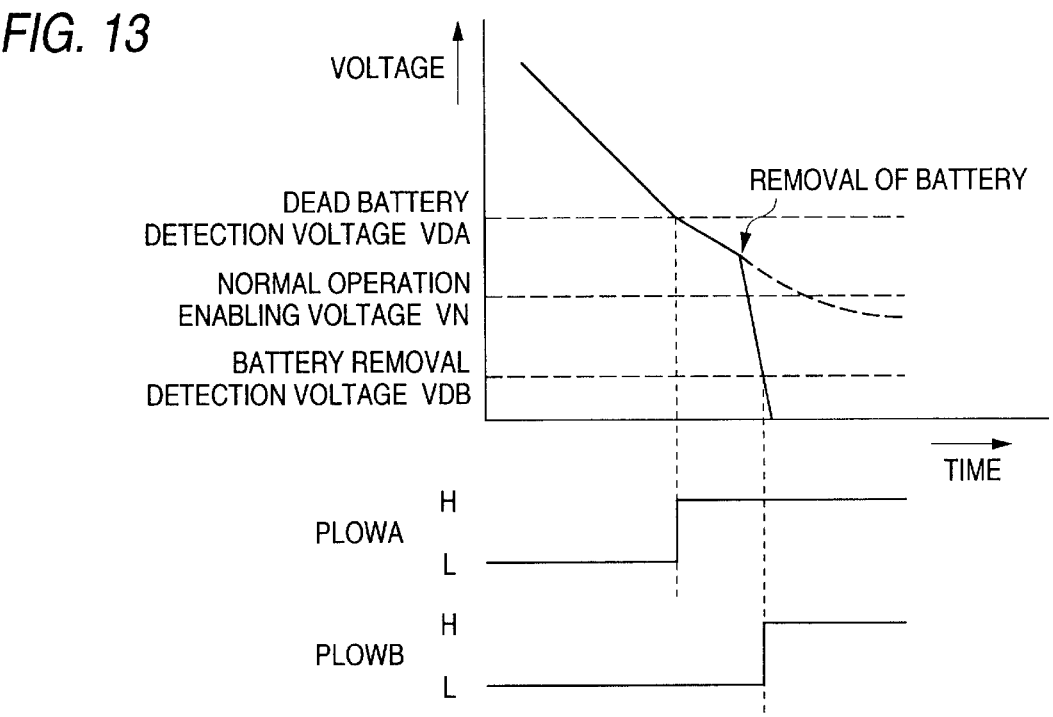

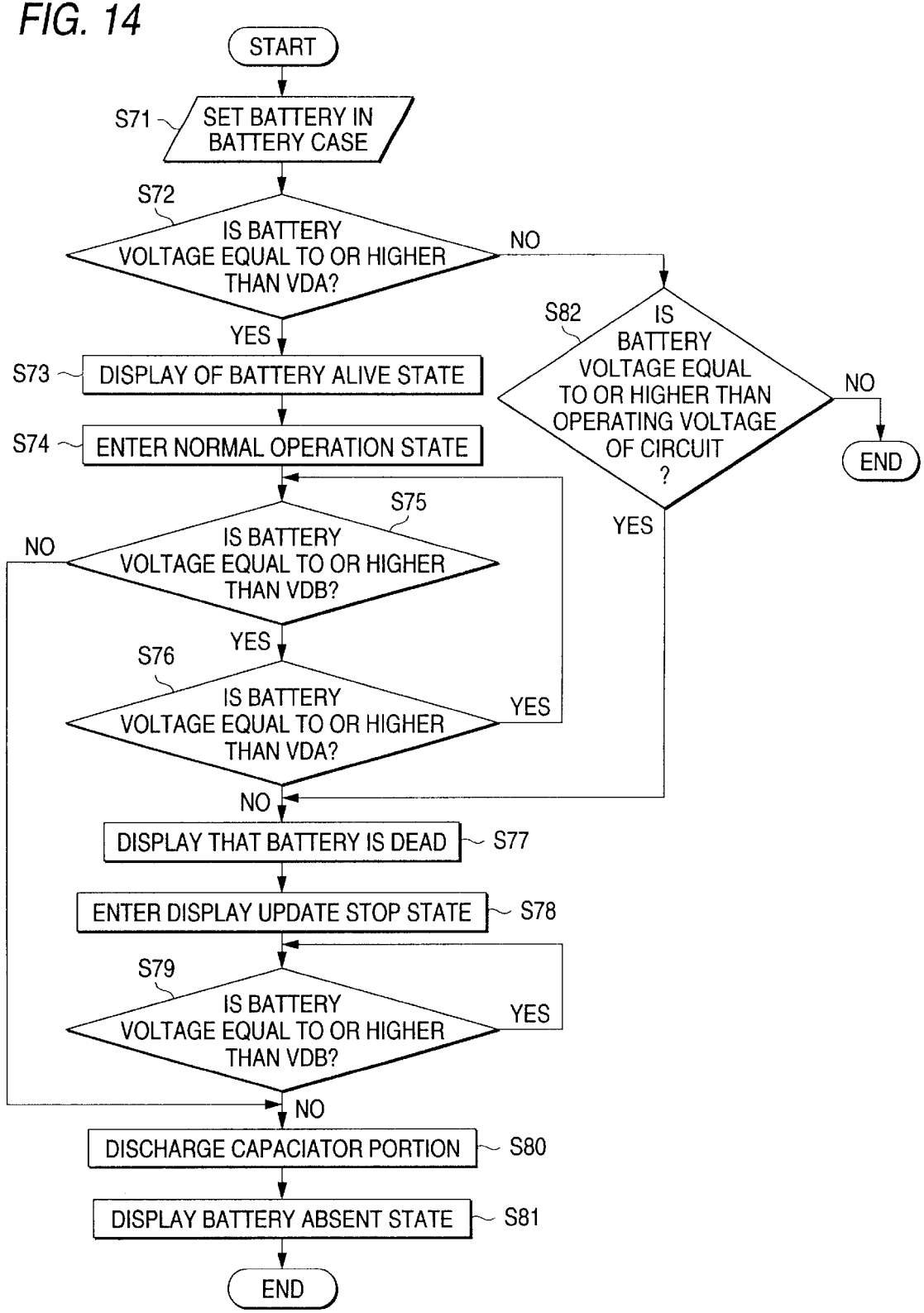

DISPLAY OF BATTERY ALIVE STATE

DISPLAY OF BATTERY DEAD STATE  PLEASE REPLACE BATTERY

DISPLAY OF BATTERY ABSENT STATE  NO BATTERY

DISPLAY APPARATUS

BACKGROUND OF THE INVENTION

1. Field of the Invention

The present invention relates to display of power supply in a display apparatus having display unit with memory properties.

2. Description of the Related Art

Commonly used conventional display apparatuses include CRTs and TN type or STN type liquid crystal displays. Display on those display apparatuses disappears when the supply of power is stopped.

However, bistable ferroelectric liquid crystals have recently been developed and put in use in display apparatuses. Such ferroelectric liquid crystals have memory properties and are characterized in that they keep on displaying even if the supply of power is stopped after a display is presented. Therefore, it is only required to supply power to a display apparatus, for example, only when a display is changed, and the supply of power can be stopped while the user is looking at the display, which makes it possible to achieve a significant reduction of power consumption. For example, they may be loaded on battery-driven apparatuses and the like, and they can provide a long life even in such a case.

However, users are accustomed to the fact that a display disappears when the supply of power is stopped by their experiences. For example, this has resulted in a problem in that a user may not be aware of dead batteries when a display apparatus having memory properties keeps on displaying. Specifically, even when batteries die, the user may believe that the batteries are still alive because the display is still maintained. For example, in the case of an apparatus that receives information to be displayed from outside, even when the reception of information has been disabled by dead batteries, the user may believe that information has been received without becoming aware of the fact or may suspect the apparatus to be defective because of the disabled reception. In addition, since the apparatus may be randomly and repeatedly operated in such a state, the consumption of the batteries is further accelerated.

Further, although a voltage drop causes a display to stay unchanged even if the apparatus is operated, the user may misunderstand the same state as a trouble of the apparatus instead of recognizing the dead batteries. Furthermore, since a display is maintained even when the batteries are removed, the user may even be unaware of the fact that the batteries have been removed. A problem arises when batteries are inserted in verse in that the restoration of a normal state can not be recognized because there is no change in a display.

In consideration to such problems, for example, according to Japanese patent No. 2670045, Japanese Patent Laid-Open Nos. H6-4041 and H6-4047 and the like, a unit for detecting a power supply off state is provided, and a screen is initialized by an initializing unit when it is detected that the power supply is off. According to the disclosure of Japanese Patent Laid-Open No. H8-110511, a unit for detecting a power supply off sate similar to those in the above-mentioned articles is provided, and a voltage for turning off a displayed screen is applied for a period corresponding to one frame or more when it is determined that the power supply is off. According to any of those articles, since a display on an apparatus is turned off when the power supply is turned off, a user can operate the apparatus with operability similar to that of conventional display apparatuses such as CRTs. However, this eliminates the advantage in that a display is saved even when the power supply is turned off.

Japanese Patent Laid-Open No. H6-274120 discloses a technique in which characteristics of a display having memory properties are utilized to preserve a state of the display as it is when a drop of the power supply voltage attributable to runaway of a computer, circuit abnormality or the like is detected. This makes it possible to easily store and maintain the contents of a display immediately before the occurrence of abnormality. Further, Japanese Patent Laid-Open No. H8-160385 discloses a display apparatus in which system information is always displayed in a display area to allow information that has been displayed when the power supply is interrupted to be displayed at a low cost after the interruption of the power supply or when the power supply is turned on again utilizing memory properties of the display area.

In those apparatuses, however, although a display can be maintained at the time of the interruption of the power supply, the user can not recognize dead batteries or the like as described above because the display is maintained. According to those articles, therefore, no solution is proposed for the problem of users' inability to know the state of batteries as described above.

SUMMARY OF THE INVENTION

The invention has been made taking the above-described situation into consideration and provides a display apparatus which utilizes a display unit having memory properties and which notifies a user of a low battery level, the absence of the batteries, the restoration of a normal voltage as a result of reloading of the batteries, and the like.

According to the invention, there is provided a display apparatus having a display unit having memory properties, a control unit which causes the display unit to display information and a battery which supplies power to each part, characterized in that the control unit causes the display unit to display that the battery is dead when the amount of energy of the battery is reduced and causes it to maintain the display indicating the dead battery utilizing the memory properties of the display unit. The display indicating the dead battery can be presented using a part or the entirety of a display screen, and a method for replacing the battery can be displayed. With such a configuration, even if a display is maintained on the display unit when the battery is dead, the user can recognize the fact that the battery is dead because the display indicating the dead battery is presented. A reduction of the amount of energy of the battery can be detected from a drop of the voltage of the same below a predetermined voltage.

In the case of a reduction of the amount of energy of the battery (e.g., a voltage drop), the screen display may be disturbed when the display is updated thereafter. Under such circumstances, for example, the display unit may be controlled such that it does not update a display even when it receives an instruction from the user until the battery is replaced after a display is presented to indicate the fact that the battery is dead. In this case, when the display apparatus performs operations other than displaying, e.g., a function of receiving information to be displayed from the outside, the reception of information can be continued.

Further, the battery can be removed for reasons other than a reduction of the amount of energy thereof as a result of consumption. In order to cope with such a situation, a capacitor unit can be provided which stores power to allow at least a part of the display unit to be rewritten when the battery is removed. A display indicating the removal of the battery is presented on a part or the entirety of the display screen of the display unit while power is being supplied from the capacitor unit in the absence of the battery. At this time, the display indicating the removal of the battery may be a display which is different from the display indicating that the battery is dead.

Such a display indicating the fact that the battery is dead or removed is maintained as it is unless it is rewritten. Therefore, the display indicating the fact that the battery is dead or removed is maintained, for example, even when the battery is replaced with a new one. In order to avoid such a situation, when an amount of energy equal to or greater than a predetermined value is detected after the battery is replaced, the display on the display unit is updated, for example, to display that the battery is sufficient, to display an initial screen at the time of activation or to display the screen which has been shown before the battery is replaced. This makes it possible to notify the user of the fact that power has been recovered by inserting a new battery.

Further, when the display unit employs plural display methods which consume different amounts of power, control can be performed such that a reduction of the amount of energy of the battery is detected at a point in time when the amount of energy is greater than an amount of energy at which a dead battery is detected and such that the display method of the display unit is switched to a method which results in smaller power consumption. This makes it possible to suppress power consumption of the battery and to thereby increase the life of the battery. When the display method of the display unit is switched, a display indicating that the battery has become low can be presented to warn the user. For example, a reduction in the amount of energy of the battery can be detected from the voltage of the battery, and control can be performed such that the battery voltage is compared with a first voltage at which a dead battery is detected and a second voltage higher than the first voltage and such that the display method of the display unit is switched to a method which results in smaller power consumption when the battery voltage drops below the second voltage.

BRIEF DESCRIPTION OF THE DRAWINGS

Preferred embodiments of the present invention will be described in detail based on the following figures, wherein;

FIG. 11 is an illustration of an example of a display of a battery low state;

FIG. 12 is a block diagram of an example of a power supply unit 17 in a second embodiment of a display apparatus according to the invention;

FIG. 13 is an illustration of examples of detection voltages and voltage drop signals in the second embodiment of the display apparatus according to the invention;

FIG. 14 is a flow chart of an example of an operation associated with consumption and replacement of batteries in the second embodiment of the display apparatus according to the invention.

DETAILED DESCRIPTION OF THE PREFERRED EMBODIMENTS

Figure 1:
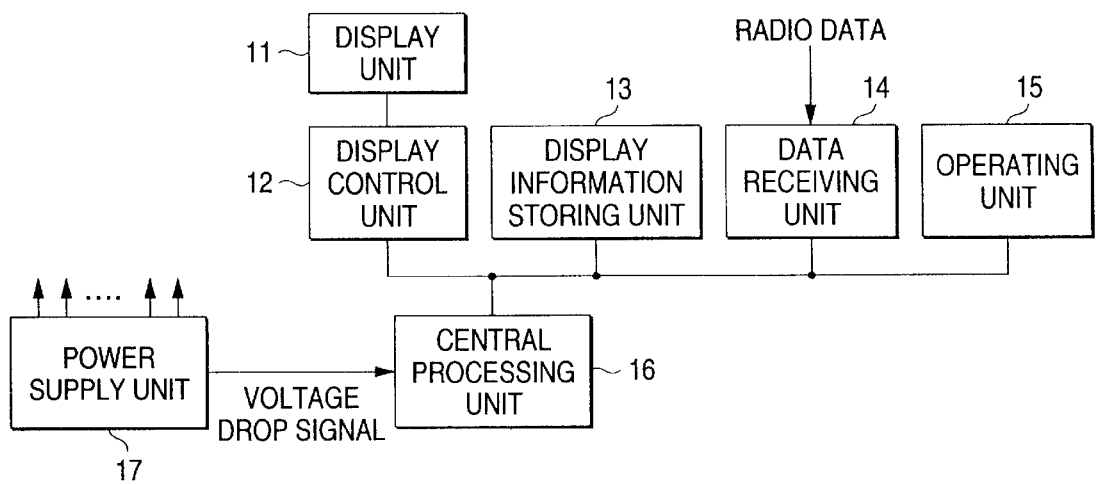
FIG. 1 is a block diagram of a first embodiment of a display apparatus according to the invention.

FIG. 1 is a block diagram of a first embodiment of a display apparatus according to the invention. In FIG. 1, 11 represents a display unit; 12 represents a display control unit; 13 represents a display information storing unit; 14 represents a data receiving unit; 15 represents an operating unit; 16 represents a central processing unit; and 17 represents a power supply unit.

The display unit 11 displays display information written by the display control unit 12. The display unit 11 has memory properties, and written display information can be kept displayed as it is even when no power is supplied. The displayed information can be changed by writing of display information carried out by the display control unit 12. As the display unit 11, for example, various types of displays having memory properties may be used including displays utilizing ferroelectric liquid crystals, cholesteric liquid crystals, electrophoresis, magnetic induction and the like. Further, the display unit is not limited to two tones, i.e., black and white and may be capable of displaying multi-tone images, color images or the like.

The display control unit 12 changes the display on the display unit 11. Under control of the central processing unit 16, display information for one screen is read from among display information stored in the display information storing unit 13, transformed into the form of a bitmap if necessary and sent to the display control unit 12. The display control unit 12 converts the display information into a signal for driving the display unit 11. The display control unit 12 can directly read display information for one screen from the display information storing unit 13. Alternatively, display information in the display information storing unit 13 may be temporarily written in a memory in the central processing unit 16 and may be read thereafter. Furthermore, a DMA controller may be separately provided, and the DMA controller may perform reading in accordance with an instruction from the central processing unit 16. The display control unit 12 may change the display in a part of the screen of the display unit 11. The reading of display information is similarly performed also in this case.

The display information storing unit 13 can store plural pieces of display information. In this example, display information received by the data receiving unit 14 is written under control of the central processing unit 16. It is assumed here that the display information storing unit 13 is non-volatile and that stored display information is not lost even when the batteries become low. In this case, for example, a flash memory, an EEPROM, a magnetic disk or the like may be used as the display information storing unit 13. Alternatively, it is possible to employ a configuration to allow loading of a memory card or memory stick in which display information is stored. While a possible memory format for display information in the display information storing unit 13 is the bitmap format, when the format of display information received by the data receiving unit 14 is not the bitmap format, e.g., when the information is described using character code data, compressed raster data or a language for drawing, the information may be stored in a format therefor. Even if the received information has such a format, the received information may be transformed by the central processing unit 16 into the bitmap format during data reception and may be stored in the display information storing unit 13 in the bitmap format.

The data receiving unit 14 receives display information that comes in from the outside. The external communication may be performed using any system. For example, a configuration may be employed which utilizes a radio communication system such as a pager receiving unit, a PHS receiving unit, a portable telephone receiving unit, a radio LAN receiving unit or an IrDA communication unit. Alternatively, a hard-wire data communication system such as Ethernet or USB may be used. Furthermore, it is possible to provide plural such systems. A configuration may be used in which the data receiving unit 14 is not provided and which does not receive display information from the outside.

The operating unit 15 is used by a user for instructing changes in a display. When a user operates the operating unit 15, the contents of the operation are transmitted to the central processing unit 16.

The central processing unit 16 is constituted by a CPU, a ROM for storing programs, a RAM as a temporary storage area or working area for display data, CPU peripheral circuits such as a timer, etc, and the central processing unit 16 controls the display apparatus as a whole. When the data receiving unit 14 receives new display information, the central processing unit 16 reads the display information from the data receiving unit 14 and stores it in the display information storing unit 13. When the data receiving unit 14 receives new display information and the new display information is stored in the display information storing unit 13 or when the operating unit 15 is operated by a user to instruct a change in a displayed page, the central processing unit 16 instructs the display control unit 12 to make a change in the display information and transmits the information to be displayed to the display control unit 12. When display information is not in the bitmap format, the central processing unit 16 also transforms it into the bitmap format. When the storage format of the display information storing unit 13 is the bitmap format, it transforms newly received information into the bitmap format when the data receiving unit 14 receives the display information. When data are stored in the display information storing unit 13 in the same format as that used for reception, the central processing unit 16 transforms the data into the bitmap format when transmitting the display information to the display control unit 12.

Further, the central processing unit 16 can receive a voltage drop signal transmitted by the power supply unit 17. The central processing unit 16 can detect that the batteries have become low as a result of a reduction in the amount of energy of the batteries from such a voltage drop signal. When the batteries are low, it transmits display information indicating dead batteries to the display control unit 12 to instruct the display control unit 12 to change the display on the display unit 11. The display information indicating the dead batteries may be displayed in a part or entirety of the display screen and, for example, a method for replacing the batteries may be displayed in addition to the message indicating the dead batteries. Such a display of dead batteries notifies the user of the fact that the batteries have been consumed. This allows the user to know the batteries have been consumed even when display is continued as it is.

When the display unit 11 employs plural display methods which result in different amounts of power consumption, a configuration may be employed in which low batteries are detected at a point in time at which dead batteries are detected and in which the display method of the display unit 11 is switched at that point in time to suppress the consumption of the batteries. Low batteries are detected by the power supply unit 17 which will be described later, and a voltage drop of the batteries can be detected from, for example, a detection voltage higher than a voltage at which dead batteries are detected. A configuration may be employed in which a display indicating the fact that the batteries have become low is presented on the display unit 11 at the point in time when the display method is switched. Obviously, the display methods may be switched in several steps. When the batteries are consumed further, the display may be changed to indicate the dead batteries.

After such a display indicating the dead batteries is presented, control is performed to prevent acceptance of any display changing operation from the operating unit 15 until the batteries are replaced with new ones. This prevents the display screen from being updated when the batteries are low to avoid a confused display. For example, the reception of display information at the data receiving unit 14 may be continued as it is until the batteries are replaced with new ones. When dead batteries are once detected, the display indicating the dead batteries is kept unchanged even if the power of the batteries is recovered. The reason is that the batteries are subjected to an unavoidable reduction in the amount of energy even if the power is recovered when the display is resumed and this results in an unstable display operation.

The central processing unit 16 rewrites the display indicating the dead batteries if the voltage is recovered when the batteries are replaced with new ones after the display indicating the dead batteries. For example, the message indicating the dead batteries may be cleared. Alternatively, a display indicating that the batteries are full may be presented. Still alternatively, the screen may be returned to the initial state or to the state before the batteries are dead.

The power supply unit 17 is constituted by batteries and supplies power to each part of the apparatus. Further, it has a configuration to monitor the amount of energy of the batteries and generates a voltage drop signal when the batteries have become low. For example, the amount of energy of the batteries can be monitored by monitoring the voltage of the batteries. When the battery voltage drops below a predetermined value, the voltage drop signal may be generated. For example, when the batteries are secondary batteries incorporated in the display apparatus, the amount of energy of the batteries may alternatively be monitored by integrating currents that flow therethrough to calculate the used amount. The voltage drop signal may be generated when the used amount exceeds a predetermined value. Obviously, the consumption of the batteries may be monitored by monitoring the amount of energy of the batteries using any other method. The following description will be based on an assumption that the consumption of the batteries is monitored from the voltage of the batteries by way of example.

In a configuration that allows monitoring using plural energy levels, e.g., a configuration that allows comparison with plural threshold voltages, a signal indicating a range to which the energy level of the batteries belongs may be output to the central processing unit 16 as the voltage drop signal. When the amount of energy (e.g., voltage) of the batteries falls below a range in which the central processing unit 16 can operate, the supply of power to the apparatus as a whole may be stopped.

Figure 2A:
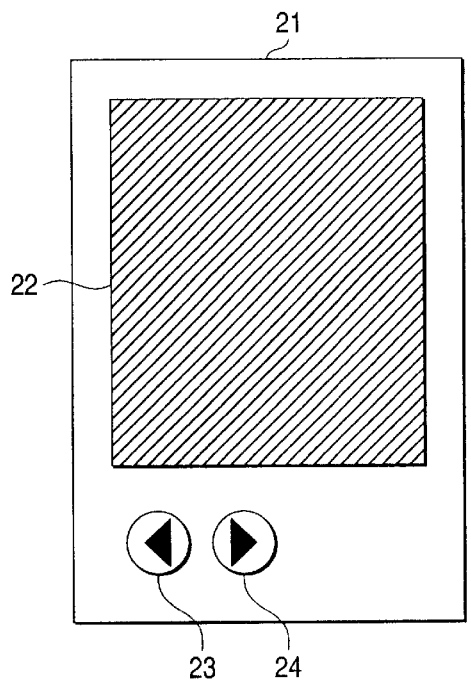
FIGS. 2A and 2B are external views of an example of the display apparatus according to the invention.
Figure 2B:
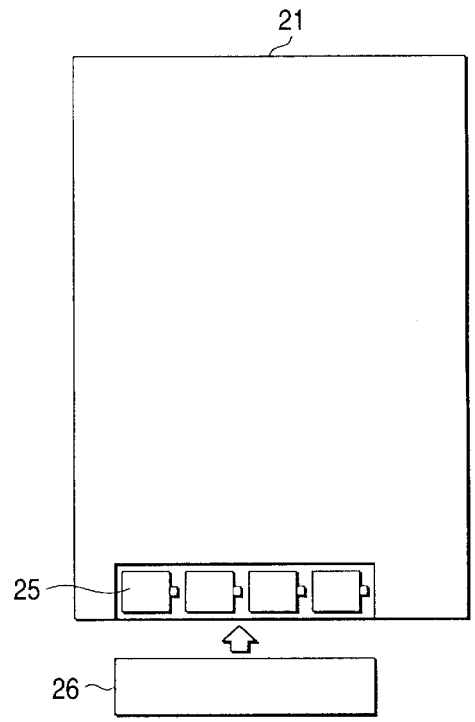

FIGS. 2A and 2B are external views of an example of the display apparatus according to the invention. FIG. 2A is a front view of the display apparatus, and FIG. 2B is a rear view of the display apparatus. In those figures, 21 represents the display apparatus; 22 represents a display screen; 23 represents a backward page-turning button; 24 represents a forward page-turning button; 25 represents batteries; and 26 represents a battery case cover.

The display screen 22 on the display unit 11 in FIG. 1 is provided on the display apparatus 21. The backward page-turning button 23 and forward page-turning button 24 for page-turning operations are provided around the same. The bptb 23 and fptb 24 constitute the operating unit 15 in FIG. 1 as a whole or a part of the same. The bptb 23 is a button which causes the page preceding the current page to be displayed each time it is operated. The fptb 24 is a button which causes the page succeeding the current page to be displayed each time it is operated. A user can operate the bptb 23 or fptb 24 to change the display information to be displayed on the display unit 11.

A battery case is incorporated in the display apparatus 21 at a rear part thereof, and the batteries 25 that constitute the power supply unit 17 are loaded in the same. The batteries 25 can be replaced by opening the battery case cover 26. For example, four unit four cells may be used as the batteries 25. The quantity of the batteries 25 is not limited to four, and the configuration of the same is not limited to the configuration of unit four cell. The batteries may be used in combination with an AC power supply. Further, chargeable secondary batteries may be used as the batteries 25. In this case, the charging of the batteries may be performed in the display apparatus 21 by providing an AC power supply in the display apparatus 21 and may alternatively be performed using a separate charger.

Figure 3:
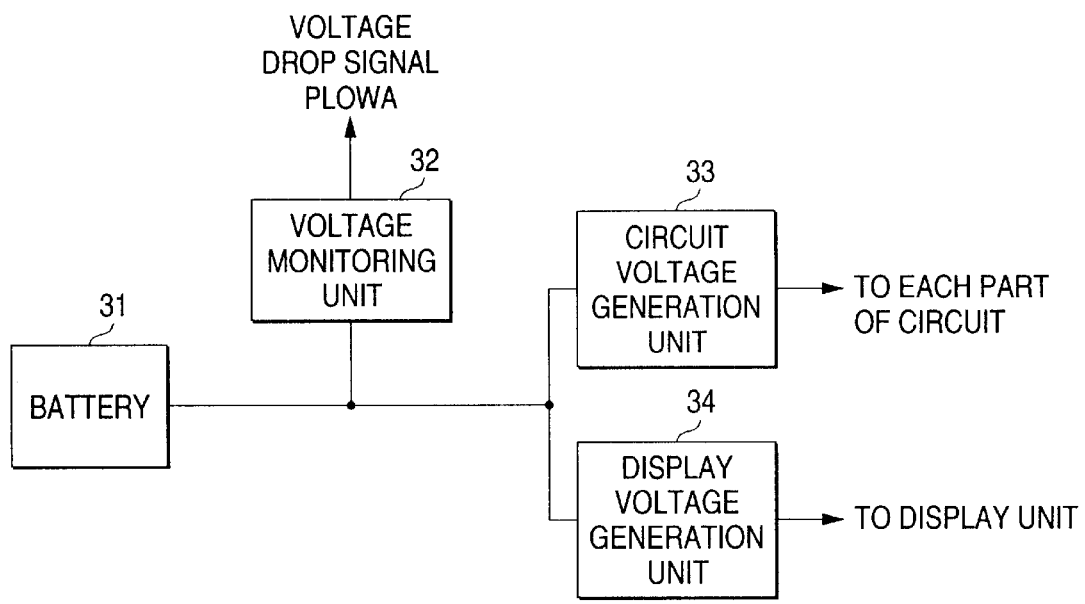
FIG. 3 is a block diagram of an example of a power supply unit 17 in the first embodiment of the display apparatus according to the invention.

FIG. 3 is a block diagram of an example of the power supply unit 17 in the first embodiment of the display apparatus according to the invention. In FIG. 3, 31 represents batteries; 32 represents a voltage monitoring unit; 33 represents a circuit voltage generation unit; and 34 represents a display voltage generation unit. The batteries 31 are batteries 25 as shown in FIG. 2. The power provided by the batteries 31 is stabilized by the circuit voltage generation unit 33 into power to drive the circuit of each part of the apparatus and is supplied to each part. The display voltage generation unit 34 generates a voltage for driving the display unit II and supplies the same to the display unit 11. In order to reduce power consumption, the display power may be supplied only when the display unit 11 is to be driven. When the circuit voltage and display voltage may be the same, there is no need for separating the circuit voltage generation unit 33 and the display voltage generation unit 34. Further, the circuit voltage generation unit 33 may be configured to stop supplying power to the circuits when the battery voltage drops below a normal operation enabling voltage VN of the circuits to prevent malfunction of the circuits. In order to prevent breakdown of the circuits attributable to reverse insertion of the batteries 31 or the like, a protection circuit (not shown) may be provided.

The voltage monitoring unit 32 detects when the batteries 31 become low. The voltage monitoring unit 32 measures the voltage of the batteries 25 and changes a voltage drop signal PLOWA from an "L" level to a "H" level when the voltage falls below a predetermined dead battery detection voltage VDA. Thus, it notifies the central processing unit 16 of the fact that the batteries 31 have become low. When the monitoring of the amount of energy of the batteries is performed using a different method which utilizes, for example, the amount of a current instead of the voltage as described above, the configuration of the voltage monitoring unit 32 may be changed in accordance with the method.

Figure 4:
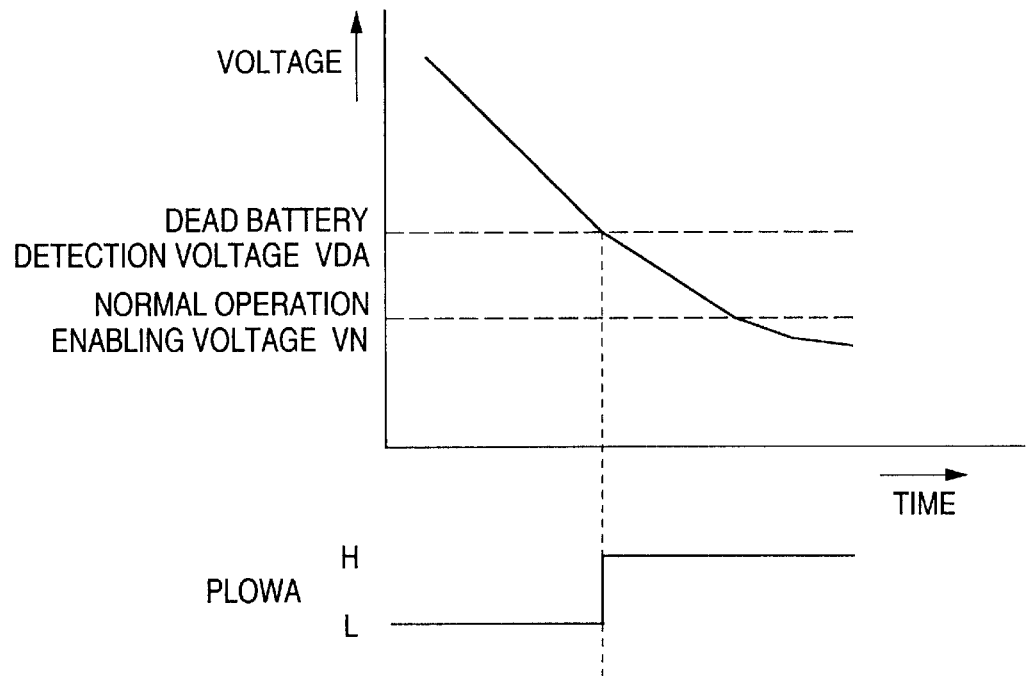
FIG. 4 is an illustration of examples of a dead battery detection voltage and a voltage drop signal.

FIG. 4 is an illustration of examples of the dead battery detection voltage and voltage drop signal. In FIG. 4, the normal operation enabling voltage VN is a voltage level at which the display apparatus 21 as a whole can operate normally. The dead battery detection voltage VDA is set at a voltage which is higher than the normal operation enabling voltage VN. The battery voltage decreases as time passes, and the voltage drop signal PLOWA becomes the "H" level when the battery voltage falls below the dead battery detection voltage VDA. At this time, the voltage that allows normal operations of the display apparatus 21 is supplied from the batteries 25 to parts other than the display unit 11. Therefore, operations other than display can be continued as they are. For example, the process of receiving display information at the data receiving unit 14 and the like may be continued. When the battery voltage falls below the normal operation enabling voltage VN, since the circuit voltage generation unit 33 becomes unable to supply power at a normal voltage, the circuit at each part of the apparatus stops operating.

The voltage of the batteries 31 may recover depending on the type of the same when the display operation that consumes a great amount of power is stopped. However, for example, even if the voltage of the batteries 31 recovers to a value equal to or higher than the dead battery detection voltage VDA, the voltage of the batteries 31 is expected to drop when the display is resumed. Therefore, when the voltage of the batteries 31 falls below the dead battery detection voltage VDA even once, a display is not updated until the batteries 31 are replaced. In order to achieve such control, for example, the voltage monitoring unit 32 may be configured such that it keeps the voltage drop signal PLOWA at the "H" level after the voltage of the batteries 31 falls below the dead battery detection voltage VDA. Alternatively, a configuration may be employed in which such control is performed by the central processing unit 16 and in which the voltage monitoring unit 32 performs only the comparison of the voltage level.

Figure 5:
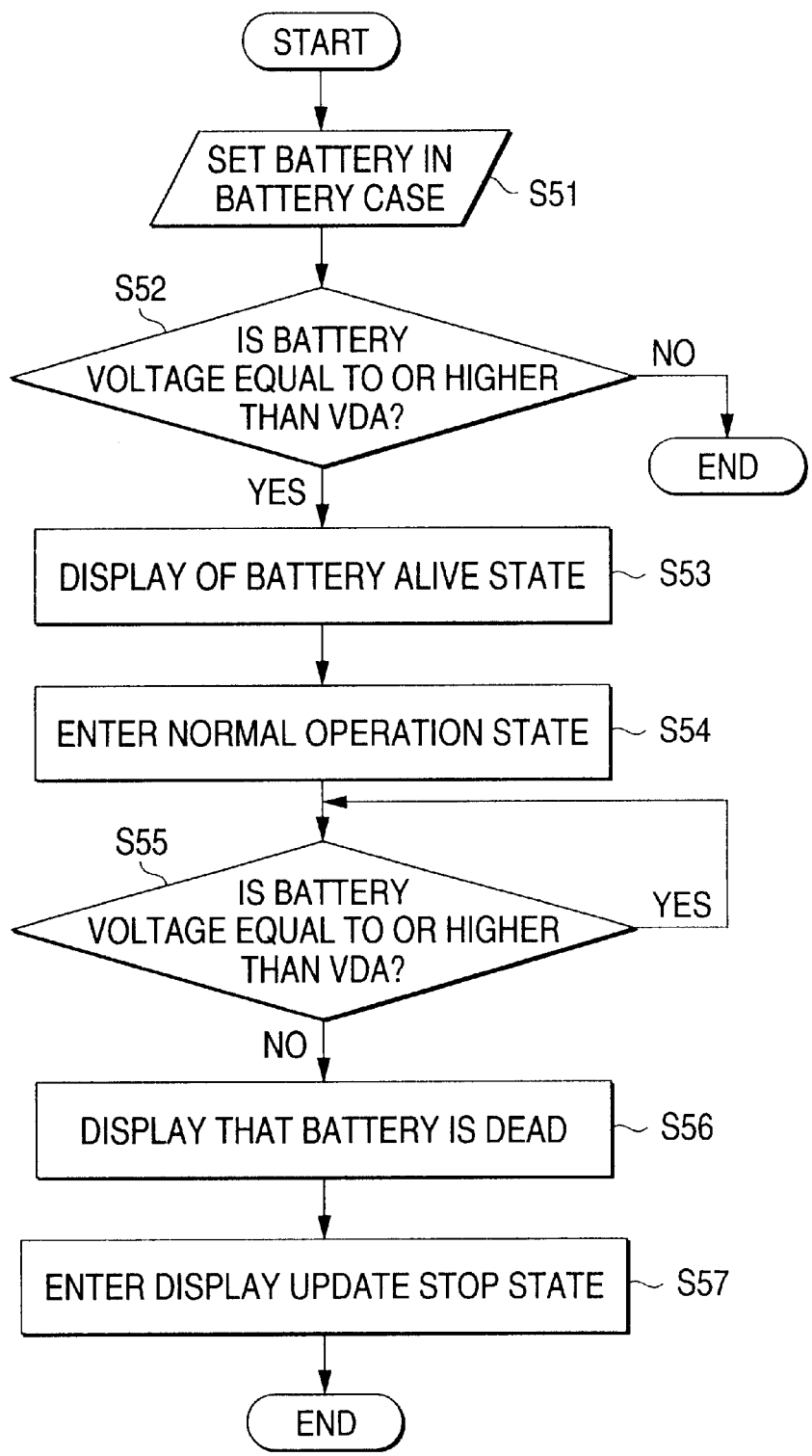
FIG. 5 is a flow chart of an example of an operation associated with consumption and replacement of batteries in the first embodiment of the display apparatus according to the invention.

FIG. 5 is a flow chart of an example of an operation associated with consumption and replacement of batteries in the first embodiment of the display apparatus according to the invention. First, the batteries 25 are set in the battery case as shown in FIG. 2B at step S51. As a result; the power supply unit 17 starts operating; the circuit voltage generation unit 33 starts supplying power to the circuit in each part; and the process proceeds to step S52. At step S52, the central processing unit 16 determines whether the voltage of the batteries 25 is equal or higher than the dead battery detection voltage VDA. As shown in FIG. 4, the level of the voltage drop signal PLOWA is "L" when the voltage of the batteries 25 is equal to or higher than the dead battery detection voltage VDA and is "H" when the voltage is lower than the dead battery detection voltage VDA. The central processing unit 16 can therefore determine the degree of consumption of the batteries by checking the level of the voltage drop signal PLOWA.

When batteries which have been consumed to a voltage lower than the dead battery detection voltage VDA are set, the process is terminated with an instruction for battery replacement kept displayed. In this case, the instruction for battery replacement remains because normal display can not be performed, although operations other than displaying are possible. When batteries whose voltage is lower than the normal operation enabling voltage VN, e.g., completely consumed batteries are set, the process does not proceed to step S52 in practice because the display apparatus 21 itself does not operate. The reverse insertion of batteries or the like also prevents the process from proceeding to step S52 in practice because a protection circuit or the like disables the operation of the circuits.

Figure 6:
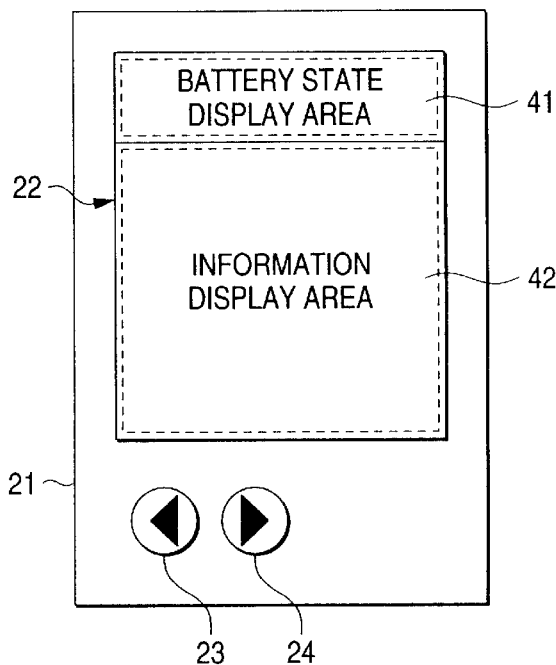
FIG. 6 is an illustration of an example of a battery state display area.
Figure 7A:
FIGS. 7A and 7B are illustrations of examples of display of battery states.
Figure 7B:

When the voltage of the batteries 25 is equal to or higher than the dead battery detection voltage VDA, the process proceeds to step S53. At step S53, since the battery voltage is sufficient, a display indicating a battery alive state is presented on the display unit 11. FIG. 6 is an illustration of an example of a battery state display area, and FIGS. 7A and 7B are illustrations of examples of display of battery states. In FIG. 6, 41 represents a battery state display area, and 42 represents an information display area. As shown in FIG. 6, in this example, the battery state display area 41 is provided in an upper part of the display screen 22, and the rest of the screen is the information display area 42. States of the batteries are displayed in the battery state display area 41. At step S53, since the battery alive state is to be displayed, the central processing unit 16 transfers bitmap data for presenting a display, for example, as shown in FIG. 7A to the display control unit 12. The display control unit 12 drives the display unit 11 such that the display in the battery state display area 41 is updated to display the battery alive state. The display in the information display area 42 is not updated. Thus, the user can recognize that the batteries are loaded and that the battery voltage is sufficient.

The display indicating the battery alive state is not limited to the mode of display shown in FIG. 7A and may be in various modes of display. For example, it is not essential to indicate the battery alive state in the battery state display area 41 and, alternatively, the battery state display area 41 may be deleted to use the same area as the information display area 42. While the battery state display area 41 may be provided in any position instead of being limited to an upper part of the display screen 22 as shown in FIG. 6, the consumption of the batteries can be suppressed by providing the same area as closely to a display starting position as possible. A configuration may alternatively be employed in which the battery state display area 41 and information display area 42 are displayed using the display screen 22 as a whole in a switching manner. In the battery alive state, the display may be switched to a screen showing the information display area 42; and an initial screen or a method for an initial operation may be displayed. A configuration may alternatively be employed in which the screen is returned to the display that has preceded the display indicating dead batteries. While the screen that has preceded the display indicating dead batteries remains on the display screen, the display can be shown as a preferable display image by re-presenting the same, for example, even when the display has been disabled in the middle or it has been partially lost because of external noises.

At step S54, the display apparatus 21 enters a normal operating state. For example, it can then receive display information at the data receiving unit 14, store the display information in the display information storing unit 13 and display the same on the display unit 11, and it can also change the display information on the display unit 11 in accordance with an instruction given by the user with the operating unit 15.

At step S55, it is determined whether the voltage of the batteries 25 is equal to or higher than the dead battery detection voltage VDA. The consumption of the batteries 25 is thus detected. The method of determination is the same as that at the step S52. When the voltage of the batteries 25 is equal to or higher than the dead battery detection voltage VDA, the operation is continued in the normal operating state. Referring to the determination at step S55, for example, the consumption of the batteries can be determined each time a predetermined time passes by providing a timer in the central processing unit 16. Alternatively, the determination may be made by interrupting the CPU in the central processing unit 16 when the voltage drop signal PLOWA changes from "L" to "H".

When the voltage of the batteries 25 is lower than the dead battery detection voltage VDA, the process proceeds to step S56. In this case, since the batteries have been consumed, a display indicating the dead batteries is presented on the display unit 11. Referring to display information to indicate the dead batteries, for example, a display as shown in FIG. 7B may be presented in, for example, the battery state display area 41 shown in FIG. 6. This process may be the same as that at step S53. Such a display allows the user to recognize that the batteries have been consumed and are to be replaced with new ones. The display of dead batteries is not limited to that shown in FIG. 7B and may be presented in various ways. The battery state display area 41 is not limited to the example shown in FIG. 6 as described above. For example, a procedure for battery replacement may be displayed using the display screen 22 as a whole.

At step S57, the display apparatus 21 enters a display update stop state. In the display update stop state, the display unit 11 is not updated even if the user operates the operating unit 15. The display unit 11 is not updated also when the data receiving unit 14 receives new display information. This process can be achieved by controlling the central processing unit 16 such that it does not control the display control unit 12. This makes it possible to prevent problems such as disturbances to a display attributable to a shortage of power as a result of repeated updates of the display by the user which promotes the consumption of the batteries further.

The data reception process at the data receiving unit 14 is preferably performed even in the display update stop state. If the data receiving process is disabled, display information transmitted at this time is ignored instead of being received or subjected to an error in the middle of reception. On the contrary, if the data receiving process is enabled, newly transmitted display information can be stored in the display information storing unit 13, although not displayed. Since the display information storing unit 13 employs a non-volatile storage device as described above, the stored display information is not erased even when the batteries are replaced. Therefore, by replacing the batteries with new ones, display information received in the display update stop state can be displayed.

Once the process transfers to the display update stop state, the state is maintained until the batteries are replaced or until the operation of the display apparatus 21 itself is stopped as a result of further consumption of the batteries that decreases the battery voltage to the normal operation enabling voltage VN or less. When the batteries are replaced, the process proceeds to step S51 at which the displaying indicating the battery alive state is presented according to the above-described process if the replaced batteries are not low. The process following the battery replacement may be automatically started. Alternatively, a configuration may be employed in which the user performs a predetermined operation through the operation unit 15. Even when the battery is further consumed to stop the operation of the display apparatus 21 itself, since the display unit 11 has memory properties, the user can refer to information displayed in the information display area 42. Therefore, for example, by displaying a procedure for replacing the batteries in the battery state display area 41, the batteries can be replaced according to the display information because it is kept displayed even when the batteries are removed.

Figure 8:
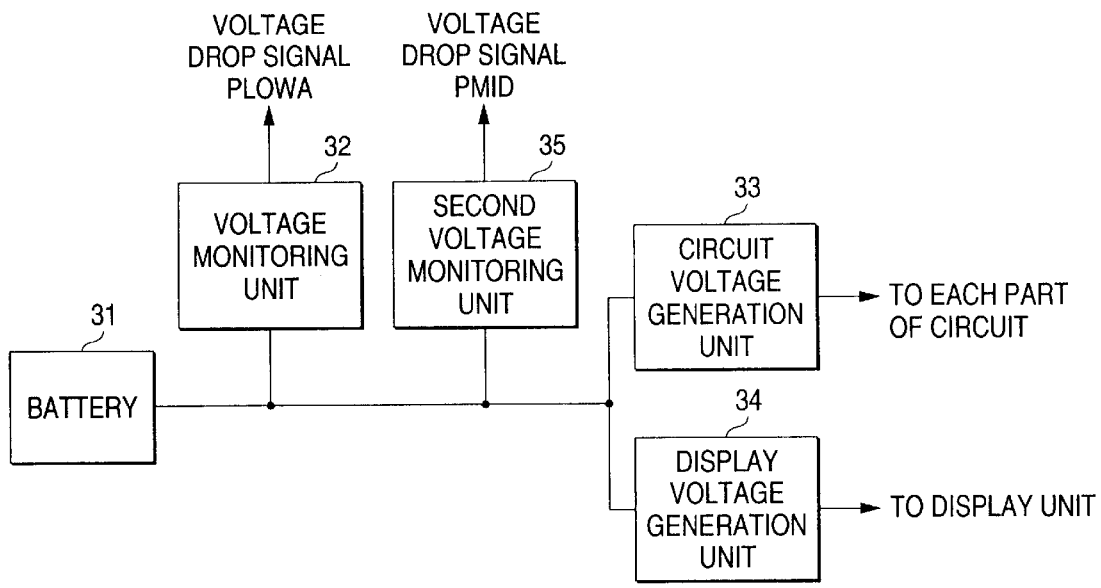
FIG. 8 is a block diagram of another example of the power supply unit 17 in the first embodiment of the display apparatus according to the invention.

A description will now be made on switching of display methods in the case that the display unit 11 employs plural display methods which result in different amounts of power consumption. FIG. 8 is a block diagram of another example of the power supply unit 17 in the first embodiment of the display apparatus according to the invention. In FIG. 8, parts identical to parts in FIG. 3 are indicated by like reference numbers and will not be described. 35 represents a second voltage monitoring unit. The second voltage monitoring unit 35 monitors whether the voltage of the batteries 31 is equal to or higher than a low battery detection voltage VL which is higher than the dead battery detection voltage VDA monitored by the voltage monitoring unit 32. When the voltage of the batteries 31 falls below the low battery detection voltage VL, a voltage drop signal PMID is output. For example, when the voltage of the batteries 31 falls below the low battery detection voltage VL, the voltage drop signal PMID is changed from the "L" level to "H" level. Thus, the central processing unit 16 is notified of the fact that the batteries 31 are low. Obviously, the second voltage monitoring unit 35 may employ a method that does not rely upon the voltage, e.g., an integrated value of currents, as the method for monitoring the amount of energy of the batteries. In any case, what is required for the second voltage monitoring unit 35 is to detect a reduction in the amount of energy of the batteries when the amount of energy is still greater than the amount of energy of the batteries monitored by the voltage monitoring unit 32.

The central processing unit 16 can recognize that the voltage of the batteries 31 has become low when the voltage drop signal PMID transmitted from the power supply unit 17 changes from the "L" level to the "H" level. This makes it possible to switch the display unit 11 between a display operation based on a normal display method and a display operation based on a display method that consumes less power. When the voltage of the batteries 31 falls below the low battery detection voltage VL, the central processing unit 16 can switch the operation of the display unit 11 to the display method that consumes less power to decrease the consumption of the batteries 31 and to thereby increase the life of the same.

Figure 9:
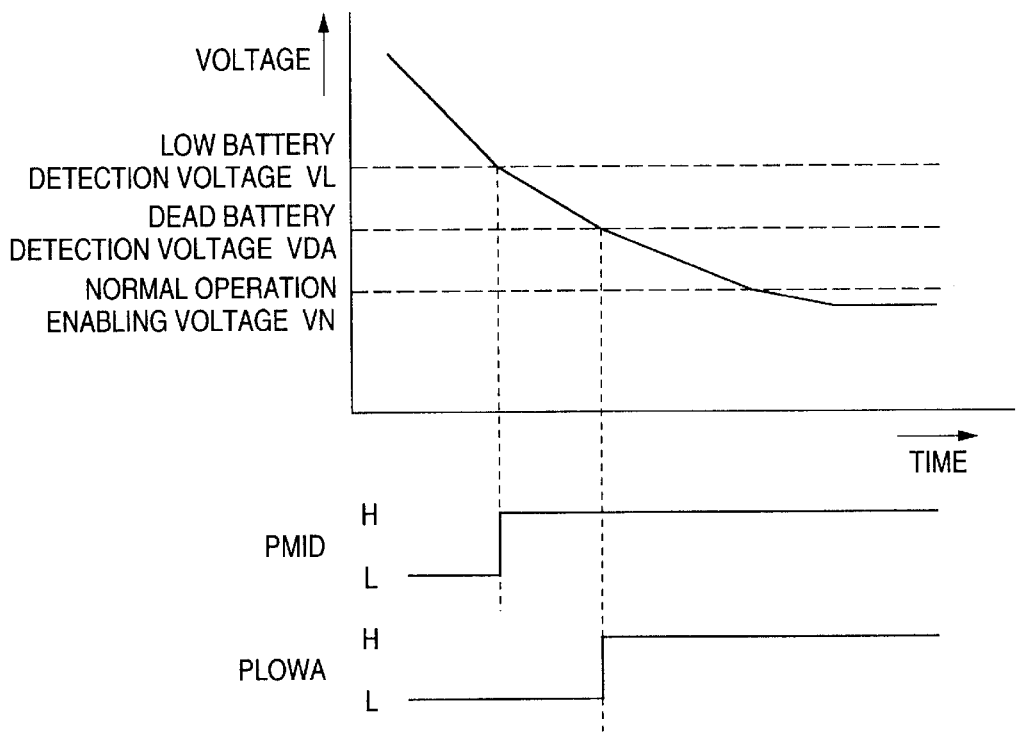
FIG. 9 is an illustration of other examples of the dead battery detection voltage and voltage drop signal.

FIG. 9 is an illustration of other examples of the dead battery detection voltage and voltage drop signal. The normal operation enabling voltage VN and dead battery detection voltage VDA are the same as those in FIG. 4. The low battery detection voltage VL is set at a voltage which is higher than the dead battery detection voltage VDA. The battery voltage decreases as time passes, and the voltage drop signal PMID becomes the "H" level when the battery voltage falls below the low battery detection voltage VL. Although a voltage sufficient for a normal operation of the display apparatus 21 is supplied to parts of the apparatus other than the display unit 11 from the batteries 25 at this point in time, the batteries 31 are expected to be immediately used up if the display method is kept unchanged. Therefore, the apparatus is enabled for operations including the display operation with the display method switched to the method that consumes less power. As shown in FIG. 9, this makes it possible to reduce the consumption of the batteries 31 and to increase the life of the batteries 31.

When the voltage of the batteries 31 falls below the dead battery detection voltage VDA even when the display method consuming less power is thus used, the display process may be stopped with the display indicating the dead batteries presented as described above.

In this case, depending on the type of the batteries 31, the voltage may also be recovered before the display is updated even when a temporary voltage drop attributable to the display method consuming high power causes the voltage of the batteries 31 to fall below the low battery detection voltage VL. However, once the voltage of the batteries 31 falls below the low battery detection voltage VL, even if the voltage is recovered thereafter, it is expected that the use of the display method consuming high power will cause the voltage to fall below the low battery detection voltage VL again. Therefore, when the voltage of the batteries 31 falls below the low battery detection voltage VL even only once, display is performed using the display method that consumes less power even of the voltage is recovered.

For example, the display unit 11 may employ a display method in which images are written after the screen as a whole is cleared and a display method in which rewriting is performed line by line. In the case of the display method in which images are written after the screen as a whole is cleared, high power is consumed when the screen is cleared, although the display can be changed at a high speed. In the case of the display method in which rewriting is performed line by line, it takes a long time to change a display, although no high power is consumed at a time. When the display unit 11 is adapted for such two types of display methods, for example, the display method in which images are written after clearing the screen as a whole is normally used because of the capability of changing a display at a high speed. When the voltage drop at simultaneous clearance frequently falls below the low battery detection voltage VL, updating of a display may be continued by switching the display method to the method in which rewriting is performed line by line to reduce power consumption, although the display speed is decreased. Such a display method is obviously an example, other display methods may be employed such as a display method in which rewriting is performed pixel by pixel.

Figure 10:
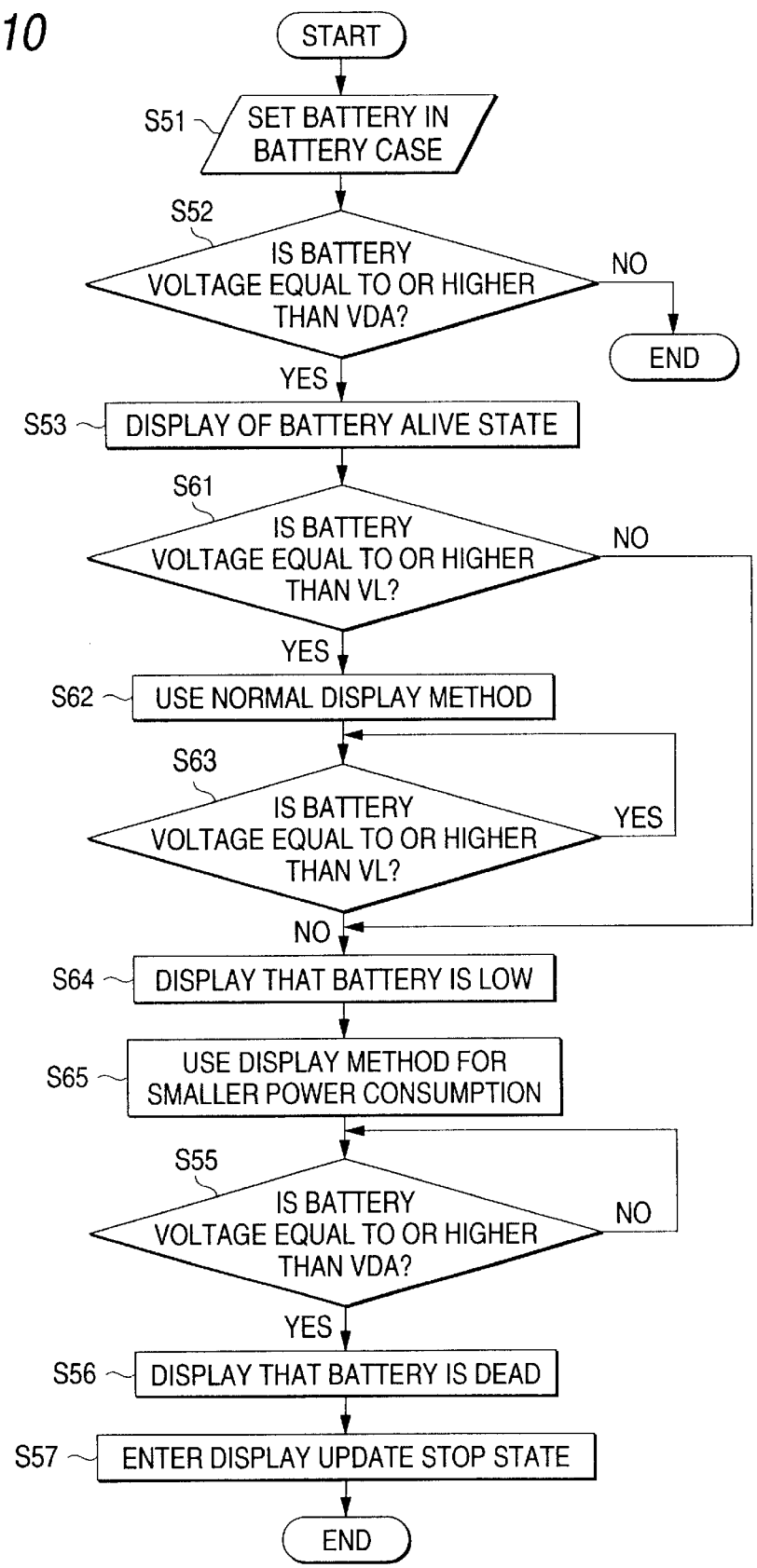
FIG. 10 is a flow chart of another example of the operation associated with consumption and replacement of batteries in the first embodiment of the display apparatus according to the invention.

FIG. 10 is a flow chart of another example of the operation associated with consumption and replacement of batteries in the first embodiment of the display apparatus according to the invention. Processes which are identical to those in FIG. 5 are indicated by like reference numbers and will not be described. The example of operation shown in FIG. 10 is an example in which the voltage of batteries 25 is equal to or higher than the dead battery detection voltage VDA and in which an operation of switching display methods is added as a normal operation in a situation where the display operation is possible.

After a display indicating the battery alive state is presented on the display unit 11 at step S53, the process proceeds to the normal operating state. At this time, it is determined at step S61 whether the voltage of the batteries 25 is equal to or higher than the low battery detection voltage VL. If the voltage of the batteries 25 is equal to or higher than the low battery detection voltage VL, the normal display method is adapted at step S62 to perform operations in the normal operating state. It is determined at step S63 whether the voltage of the batteries 25 is equal to or higher than the low battery detection voltage VL. Thus, it is detected when the batteries 25 have become low. Operations in the normal operating state can be continued until the voltage of the batteries 25 falls below the low battery detection voltage VL. The determination at step S63 can be made using various methods. For example, the consumption of the batteries may be determined each time a predetermined time passes by providing a timer in the central processing unit 16 and, alternatively, the CPU in the central processing unit 16 may be interrupted in response to a change in the voltage drop signal PMID.

When the voltage of the batteries 25 falls below the low battery detection voltage VL, a display indicating the low batteries is presented on the display unit 11 at step S64. FIG. 11 is an illustration of an example of display of the battery low state. Referring to display information for the low batteries, for example, a display as shown in FIG. 11 may be presented, for example, in the battery state display area 41 shown in FIG. 6. This process may be performed similarly to the process at step S53 in FIG. 5. The user can recognize from such a display that the batteries have become low and that it will be required shortly to replace the batteries with new ones. Obviously, the display indicating the low batteries is not limited to that shown in FIG. 11 and may be presented in various ways. The battery state display area 41 for displaying the low batteries is not limited to the example shown in FIG. 6.

At S65, the method consuming less power is adapted as the display method, and the process proceeds to an operation in the battery low state. In this battery low state, for example, it is also possible to receive display information at the data receiving unit 14, to store the display information in the display information storing unit 13 and display the same on the display unit 11 and to change the display information on the display unit 11 in accordance with an instruction given by the user with the operation unit 15.

In the battery low state, it is determined at step S55 whether the voltage of the batteries 25 is equal to or higher than the dead battery detection voltage VDA, and operations as described with reference to FIG. 5 are performed thereafter. Thus, when the display unit 11 employs plural display methods which consumes different amounts of power, the display method can be switched depending on the state of consumption of the batteries 25 to expand the life of the batteries. Further, since display is presented to indicate that the batteries have become low when the display method is thus switched, the user can recognize that the time to replace the batteries is coming soon.

A second embodiment of a display apparatus according to the invention will now be described. The above-described first embodiment is based on an assumption that the batteries are gradually consumed and that the batteries are replaced with new ones when they are completely consumed. During the actual use of a display apparatus 1, however, the batteries may be removed or may come out before they are used up. The second embodiment is adapted even for such situations and notifies a user of the fact that the batteries are not inserted. A general block diagram for the same embodiment will not be shown and described here because it is similar to FIG. 1. The appearance of the display apparatus is also similar to that shown in FIG. 2.

FIG. 12 is a block diagram of an example of a power supply unit 17 in the second embodiment of the display apparatus according to the invention. In FIG. 12, parts identical to those in FIG. 3 are indicated by like reference numbers and are not described. 36 represents a third voltage monitoring unit, and 37 represents a capacitor unit.

The third voltage monitoring unit 36 measures the voltage of batteries 31 and changes a voltage drop signal PLOWB from an "L" level to an "H" level when the voltage falls below a predetermined battery removal detection voltage VDB. It can be determined from the voltage drop signal PLOWB whether the batteries 31 have been removed or not. Since the battery voltage becomes 0 as soon as the batteries 31 are removed (or come out), the battery removal detection voltage VDB serving as a threshold may be a voltage close to 0. Obviously, a monitoring method that relies upon something other than the voltage may be employed also at the third voltage monitoring unit 36.

The capacitor unit 37 is charged from batteries 25 when the batteries have a sufficient voltage and is discharged upon an instruction from the third voltage monitoring unit 36 when the batteries are removed. It is assumed here that the capacitor unit 37 has a capacity which is at least sufficient for supplying power for a time required for updating a part or the whole of a display unit 11 when the batteries are removed.

In order that the current discharged from the capacitor unit 37 is preferably used in circuits including the display unit 11, an arrangement may be made to prevent the current from flowing into the batteries 31 when the capacitor unit 37 is being discharged. In FIG. 12, such a function is represented by the symbol for a diode. However, the circuit element to be used is not limited to diodes.

FIG. 13 is an illustration of examples of detection voltages and voltage drop signals in the second embodiment of the display apparatus according to the invention. A normal operation enabling voltage VN, dead battery detection voltage VDA and voltage drop signal PLOWA are the same as those in FIG. 4. The battery removal detection voltage VDB is set at a voltage lower than the normal operation enabling voltage VN. Thus, the voltage drop signal PLOWB changes from the "L" level to the "H" level when the batteries 31 are removed. When the batteries are kept unremoved for a long time after they become low, there is substantially no further consumption of the batteries because the display apparatus 21 itself becomes inoperable when the voltage becomes lower than the normal operation enabling voltage VN. Therefore, when the batteries are kept unremoved for a long time after they become low, the voltage drop signal PLOWB indicating the removal of the batteries will never change to the "H" level.

FIG. 14 is a flow chart of an example of an operation associated with consumption and replacement of batteries in the second embodiment of the display apparatus according to the invention. First, the batteries 25 are set in a battery case as at step S71 as shown in FIG. 2B. As a result, a power supply unit 17 starts operating; a circuit voltage generation unit 33 starts supplying power to a circuit in each part; and the process proceeds to step S72. At step S72, it is determined whether the voltage of the batteries 25 is equal or higher than the dead battery detection voltage VDA. As shown in FIG. 13, the level of the voltage drop signal PLOWA is "L" when the voltage of the batteries 25 is equal to or higher than the dead battery detection voltage VDA and is "H" when the voltage is lower than the detection voltage VDA. A central processing unit 16 can therefore determine the degree of consumption of the batteries by checking the level of the voltage drop signal PLOWA.

When the voltage of the batteries 25 is lower than the dead battery detection voltage VDA, it is further determined at step S82 whether the voltage of the batteries 25 is equal to or higher than the normal operation enabling voltage VN. When the inserted batteries have a voltage lower than the normal operation enabling voltage VN, the process is terminated as it is. In practice, the process does not proceed to step S72 because the display apparatus 21 itself does not operate when batteries having a voltage lower than the normal operation enabling voltage VN are set. The process does not proceed to step S72 in practice also in the case of reverse insertion of batteries because circuits are disabled by a protection circuit or the like. In those cases, the display at the time of insertion of the batteries 25 remains unchanged.

When batteries which enable normal operations but whose voltage has consumed to a value less than the dead battery detection voltage VDA are set, the process proceeds to step S77, and a display indicating the dead batteries is present as will be described later.

Figure 15A:
FIGS. 15A, 15B and 15C are illustrations of examples of display of battery states in the second embodiment of the display apparatus according to the invention.
Figure 15B:
Figure 15C:
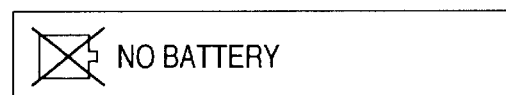

When the battery voltage is equal to or higher than the dead battery detection voltage VDA, the process proceeds to step S73. At step S73, since the battery voltage is sufficient, a display indicating a battery alive state is presented on the display unit 11. For example, as shown in the above-described FIG. 6, a battery state display area 41 may be provided in a part of the display unit 11, and the display indicating the battery alive state may be presented in the battery state display area 41. FIGS. 15A, 15B and 15C are illustrations of examples of display of battery states in the second embodiment of the display apparatus according to the invention. At step S73, since the battery alive state is to be displayed, the central processing unit 16 transfers bitmap data for presenting display, for example, as shown in FIG. 15A to the display control unit 12. The display control unit 12 drives the display unit 11 such that the display in the battery state display area 41 is updated to display the battery alive state. At this time, display in an information display area 42 is not updated. Thus, the user can recognize that the batteries are loaded and that the battery voltage is sufficient.

While the display indicating the battery alive state shown in FIG. 15A is the same as that shown in FIG. 7A, the invention is not limited to such a mode of display, and various modes of display may be use. For example, it is not essential to indicate the battery alive state in the battery state display area 41 and, alternatively, the battery state display area 41 may be deleted to use the same area as the information display area 42. The battery state display area 41 may be provided in any position instead of being limited to an upper part of the display screen 22 as shown in FIG. 6 in the second embodiment, too. A configuration may alternatively be employed in which the battery state display area 41 and information display area 42 are displayed using the display screen 22 as a whole in a switching manner. In the battery alive state, the display may be switched to a screen showing the information display area 42; and an initial screen or a method for an initial operation may be displayed. A configuration may alternatively be employed in which the screen is returned to a display that has preceded a display indicating that the batteries are dead or absent. While the screen that has preceded the display indicating dead that the batteries are dead or absent remains on the display screen, the display can be shown as a preferable display image by re-presenting the same, for example, even when the display has been disabled in the middle or it has been partially lost because of external noises.

At step S74, the display apparatus 21 enters a normal operating state. For example, it can then receive display information at the data receiving unit 14, store the display information in the display information storing unit 13 and display the same on the display unit 11, and it can also change the display information on the display unit 11 in accordance with an instruction given by the user with the operating unit 15.

At step S75, it is determined whether the voltage of the batteries 25 is equal to or higher than the battery removal detection voltage VDB. The removal of the batteries 25 can be thus detected. Referring to the determination, for example, the central processing unit 16 can determine whether the batteries 25 have been removed or not each time a predetermined time passes with a timer. However, since the discharge of the capacitor unit 37 is completed in several seconds or less after the batteries 25 are removed, it is preferable to interrupt the CPU in the central processing unit 16 when the voltage drop signal PLOWB changes from "L" to "H". When the voltage of the batteries 25 is lower than the battery removal detection voltage VDB, the process proceeds to step S80.

When it is determined at step S75 that the voltage of the batteries 25 is equal to or higher than the battery removal detection voltage VDB, it is further determined at step S76 whether the voltage of the batteries 25 is equal to or higher than the dead battery detection voltage VDA. This makes it possible to detect that the batteries 25 have become low. The method of determination is the same as that at the step S72. When the voltage of the batteries 25 is equal to or higher than the dead battery detection voltage VDA, the operation is continued in the normal operating state. In this case, the process returns to step S75 to repeat the determination whether the batteries 25 have been removed at step S75 and the determination whether the batteries have become low at step S76 in the normal operating state. Referring to the determination at step S76, for example, the consumption of the batteries can be determined each time a predetermined time passes by providing a timer in the central processing unit 16. Alternatively, the determination may be made by interrupting the CPU in the central processing unit 16 when the voltage drop signal PLOWA changes from "L" to "H".

When it is detected at step S76 that the voltage of the batteries 25 is lower than the dead battery detection voltage VDA, and when it is determined at step S82 that the voltage of the batteries 25 has consumed to a level which enables a normal operation and which is lower than the dead battery detection voltage VDA, the process proceeds to step S77. In this case, since the batteries 25 have been consumed, a display indicating the dead batteries is presented on the display unit 11. Referring to display information to indicate the dead batteries, for example, a display as shown in FIG. 15B may be presented. This process may be the same as that at step S73. Such a display allows the user to recognize that the batteries have been consumed and are to be replaced with new ones. While the example of display shown in FIG. 15B is the same as that shown in FIG. 7B, this is not limiting the invention, and the display may be presented in various ways. The battery state display area 41 is not limited to the example shown in FIG. 6 as described above. For example, a procedure for battery replacement may be displayed using the display screen 22 as a whole.

At step S78, the display apparatus 21 enters a display update stop state. In the display update stop state, the display unit 11 is not updated even if the user operates the operating unit 15. The display unit 11 is not updated also when the data receiving unit 14 receives new display information. This process can be achieved by controlling the central processing unit 16 such that it does not control the display control unit 12. This makes it possible to prevent problems such as disturbances to a display attributable to a shortage of power as a result of repeated updates of the display by the user which promotes the consumption of the batteries further.

The data reception process at the data receiving unit 14 is preferably performed even in the display update stop state. If the data receiving process is disabled, display information transmitted at this time is ignored instead of being received or subjected to an error in the middle of reception. On the contrary, if the data receiving process is enabled, newly transmitted display information can be stored in the display information storing unit 13, although not displayed. Since the display information storing unit 13 employs a non-volatile storage device as described above, the stored display information is not erased even when the batteries are replaced. Therefore, by replacing the batteries with new ones, display information received in the display update stop state can be displayed.

It is determined at step S79 whether the voltage of the batteries 25 is equal to or higher than the battery removal detection voltage VDB. This makes it possible to detect that the batteries 25 have been removed. When the voltage of the batteries 25 is equal to or higher than the battery removal detection voltage VDB, the determination is made again. This process may be performed using the same method as that at step S75. When the display update stop state is entered, the same state is maintained until the battery voltage falls below the battery removal detection voltage VDB as a result of removal of the batteries or until the operation of the display apparatus 21 itself is stopped as a result of further consumption of the batteries that decreases the battery voltage to the normal operation enabling voltage VN or less.

When the voltage of the batteries 25 is lower than the battery removal detection voltage VDB, the process proceeds to step S80. At step S80, the batteries 25 are in a removed state. The third voltage monitoring unit 36 causes the capacitor unit 37 to start discharging at the point in time when the voltage of the batteries 25 falls below the battery removal detection voltage VDB. Since the voltage abruptly drops when the batteries are removed, the discharging of the capacitor unit 37 is preferably started as quickly as possible. The discharging of the capacitor unit 37 keeps the voltage of a circuit voltage generation unit 33 and display voltage generation unit 34 at a normal value, although only for a short period.

While the normal voltage is maintained by discharging the capacitor unit 37, a display indicating a battery absent state is presented on the display unit 11 at the step S81. For example, a display as shown in FIG. 15C may be presented as display information for the battery absent state. Obviously, the display may be in any mode and, for example, a method for inserting the batteries 25 may be displayed. The display process may be the same as that at the step S73. Such a display indicating the absence of the batteries allows the user to recognize that the batteries 25 have been removed and that the batteries 25 must be inserted.

Thereafter, the discharging of the capacitor unit 37 is completed to put the display apparatus 21 in an operation stop state. Since the display unit 11 has memory properties, the user can view information displayed in the information display area 42 and set the batteries according to information in the battery state display area 41.

As a result of the above-described process, when the user replaces the batteries, if the voltage of the loaded batteries 25 is equal to or higher than the normal operation enabling voltage VN, the battery absent state is entered when the batteries 25 are removed and the battery absent state is displayed in the battery state display area 41 of the display unit 11. Thereafter, the process from step S71 is started when batteries are loaded.

When the loaded batteries 25 have been completely consumed to a voltage below the normal operation enabling voltage VN, the display indicating that the batteries are dead is presented in the battery state display area 41 of the display unit 11. The display remains even after the batteries 25 are removed. A configuration may alternatively employed in which the third voltage monitoring unit 36 operates even when the voltage of the batteries 25 is lower than the normal operation enabling voltage VN to discharge the capacitor unit 37 when the voltage falls below the battery removal detection voltage VDB and to operates circuits when the display is to be changed, thereby performing rewriting into the display indicating the battery absent state. Further, a configuration may be employed in which the discharging of the capacitor unit 37 is caused when the voltage of the batteries 25 falls below the normal operation enabling voltage VN to cause rewriting into the display indicating the battery absent state.

The process from the step S71 is started when batteries are loaded and, if the replaced batteries are not low, the battery alive state is displayed. The voltage may be unstable immediately after the loading of the batteries 25 because the charging of the capacitor unit 37 is started. Therefore, when the batteries 25 are loaded, the operation at step S72 of FIG. 14 and the subsequent steps may be started, for example, after a predetermined time passes or after the voltage becomes stable. A configuration may alternatively be employed in which the operation is started when the user performs a predetermined operation on the operating unit 15 after loading the batteries 25.

The second embodiment of the invention may be adapted to a display unit 11 that employs plural display methods consuming different amounts of power like the first embodiment.

The above embodiments have referred to examples in which primary batteries such as dry batteries are used as the power supply unit 17. However, it is possible to use chargeable secondary batteries as the power supply unit 17 as described above. In this case, since the voltage is recovered as a result of charging, the process can be performed in the same manner as described above treating charging similarly to battery replacement. When power is supplied from the outside using an AC adapter or the like, the above-described process can be also performed on an assumption that the batteries are replaced at the point in time when the supply of power from the outside is started.

Further, while each of the battery alive state, battery low state, battery dead state and battery absent state can be displayed arbitrarily as described above, for example, a configuration may be employed in which the user sets modes of display in advance to cause display in accordance with the setting. For example, a method of use is possible in which a method for battery replacement is normally displayed in the case of dead batteries and in which a setting is made to display, for example, a message simply indicating the dead batteries for a user who knows the method for battery replacement very well.

Although display is separately presented for the battery alive stage, battery low stage, battery dead stage and battery absent stage in the above-described embodiments, any display method may be employed including display varies with a greater number of stages.

As apparent from the above description, according to the invention, in a display apparatus having a display unit with memory properties, the display unit presents dead battery display when the batteries are consumed. This makes it possible to solve the problem in that the user does not recognize dead batteries because of a display that remains uncleared. Further, since the user is similarly notified of removal of batteries, recovery of a normal operation as a result of loading of batteries and the like through a change in a display on the display unit, it is possible to solve the problem in that the user may misunderstand a display which remains uncleared as a trouble when the display remains unchanged even if the batteries are removed or inserted. Thus, an advantage arises in that it is possible to solve the problems associated with the power supply which are ironically attributable to the advantage in that the display unit has memory properties and can maintain a display in the absence of the power supply.

The entire disclosure of Japanese Patent Application No. 11-371969 filed on Dec. 27, 1999 including specification, claims, drawings and abstract is incorporated herein by reference in its entirety.

What is claimed is:

1. A display apparatus, comprising:

a display unit having a memory property;

a control unit which causes the display unit to display information;

a battery which supplies power to the display unit and the control unit; and a capacitor unit which stores power to allow at least a part of the display unit to be rewritten when the battery is removed, wherein the control unit causes the display unit to display the battery is dead when an amount of energy of the battery decreases, the display indicating the dead battery is maintained by the memory property of the display unit, the control unit causes the display unit to present a display that the battery has been removed, the display that the battery has been removed being different from the display that the battery is dead, the control unit causes the display unit to present a display that the battery has been removed while power is being supplied from the capacitor unit when the battery has been removed, and the control unit causes the display unit to display a normal voltage when the battery is restored.

2. A display apparatus according to claim 1, wherein the control unit detects a decrease of the amount of energy of the battery when a voltage drops below a predetermined voltage.

3. A display apparatus according to claim 1, wherein the control unit causes a part of a display screen of the display unit to display that the battery is dead.

4. A display apparatus according to claim 1, wherein the control unit causes an entire display screen of the display unit to display that the battery is dead.

5. A display apparatus according to claim 1, wherein the control unit causes the display unit to display a method for battery replacement as a display that the battery is dead.

6. A display apparatus according to claim 1, wherein the control unit performs a control to prevent a display on the display unit from being updated until the battery is replaced after causing the display that the battery is dead.

7. A display apparatus according to claim 6, wherein the control unit disables updating of a display on the display unit by performing control to prevent acceptance of any instruction for display update from a user.

8. A display apparatus according to claim 6, wherein the control unit allows operations other than displaying to be continued.

9. A display apparatus according to claim 1, wherein the control unit causes a part or an entirety of a display screen of the display unit to display that the battery has been removed.

10. A display apparatus according to claim 1, wherein the control unit causes a display on the display unit to be updated when an amount of energy equal to or greater than a predetermined value is detected after the battery is replaced.

11. A display apparatus according to claim 10, wherein the control unit causes the display on the display unit to be updated to display that the battery is sufficient.

12. A display apparatus according to claim 10, wherein the control unit causes the display on the display unit to be updated to an initial screen at the time of activation.

13. A display apparatus according to claim 10, wherein the control unit causes the display on the display unit to be updated to the screen which has been presented when the battery is replaced.

14. A display apparatus according to claim 1, wherein the control unit employs a plurality of display methods which result in different amounts of power consumption, detects a reduction of the amount of energy of the battery at a point in time when the amount of energy is greater than an amount at which the battery is detected as dead and switches the display method of the display unit to a method which results in less power consumption.

15. A display apparatus according to claim 14, wherein the control unit detects a reduction of the amount of energy from the voltage of the battery, compares the voltage of the battery with a first voltage at which the battery is detected as dead and a second voltage higher than the first voltage and switches the display method of the display unit to a method which results in less power consumption when the voltage of the battery falls below the second voltage.

16. A display apparatus according to claim 14, wherein the control unit causes the display unit to display that the battery has become low when the display method of the display unit is switched.

* * * * *